Nov. 21, 1944. T. J. KEENAN 2,363,424
COMBINED OILING DEVICE AND OIL GAUGE STICK
Filed July 21, 1943
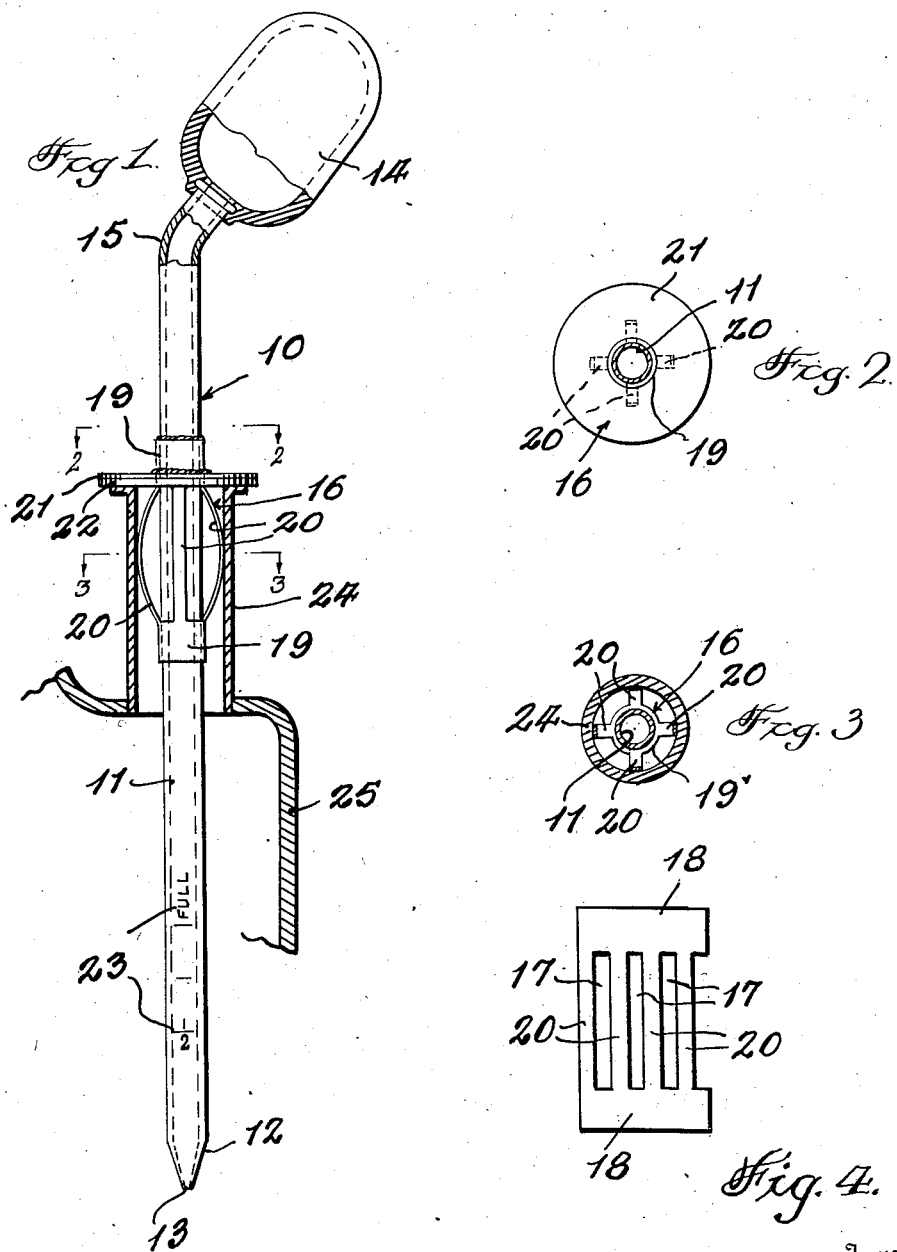
Inventor
Thomas J. Keenan,
By Christian R. Nielsen
Attorney Patented Nov. 21, 1944

2,363,424

UNITED STATES PATENT OFFICE 2,363,424

COMBINED OILING DEVICE AND OIL GAUGE STICK

Thomas J. Keenan, Steubenville, Ohio

Application July 21, 1943, Serial No. 495,593

1 Claim. (Cl. 222—208)

This invention relates to a combined oiling device and oil gauge stick, and it consists in the constructions, arrangements, and combinations herein described and claimed.

Quite often motorists find the need for lubricating various parts of their automobiles and in the past this has been accomplished by means of an oil can or the like, which must be maintained filled with lubricant, as well as requiring storage space.

It is therefore an object of the invention to provide a novel construction of portable oiling device which will function to withdraw oil from the crank case of an engine and retain the oil therein until discharged upon the part to be lubricated.

It is also an object of the invention to provide a portable oiling device which will function as a gauge stick when positioned in the gauge rod opening of the crank case of an engine, as well as forming a closure for the opening.

Additional objects, advantages and features of invention will be apparent from the following description, and accompanying drawing, wherein Figure 1 is an elevation of the combined oiling device and gauge stick, partly in section, showing the device installed.

Figure 2 is a cross section on the line 2—2 of Figure 1.

Figure 3 is a cross section on the line 3—3 of Figure 1.

Figure 4 is a plan of the blank of a spring-retaining device.

There is illustrated a combined oiling device and gauge stick 10 which consists of an elongated tube 11, the lower end 12 of which is tapered to provide a dispensing tip 13.

The end of the tube opposite the tip 13 has mounted thereon a compressible bulb 14, and preferably the tube is slightly bent, as indicated at 15, so as to present the bulb out of line with the longitudinal axis of the tube. By forming the tube in this manner, the bulb 14 will not come into contact with the body of the engine when the device is placed in the opening of the crank case and also presents the bulb at a convenient operating position.

At a suitable point downwardly from the bulb, a combined closure and retainer device 16 is secured, as will now be described.

A rectangular blank of suitable gauge resilient sheet metal is employed, as shown in Figure 4. The blank is slotted as indicated at 17, the slots stopping short of respective ends forming band portions 18. The blank thus formed is suitably shaped upon a mandrel or the like by bending the band portions to form collars 19 and 19', as shown in Figures 1, 2 and 3, of a diameter to snugly fit about the tube 11. The strips 20 formed by the slots 17 are given a longitudinal compression so as to assume an outwardly bowed relation with respect to the collars 19 and 19'. An annular disk 21 is welded to the collar 19 at a point above the strips 20 and the collar 19 in turn is welded to the tube 11. The collar 19' is free for sliding movements along the tube 11, for a purpose as will presently appear. Upon the underside of the disk 21 a leather washer 22 is secured by means of any suitable adhesive.

The exterior surface of the gauge stick or tube 11 is formed with markings 23 to indicate the quantity of oil in the crank case.

The location of the disk 21 must be such as to permit the lower end of the tube to enter the crank case to the proper depth when the washer 22 comes to rest upon the upper end of the opening for the gauge stick.

A formal showing of gauge stick opening has been illustrated in Figure 1 and consists of an upright pipe 24 secured in a portion of crank case 25. The construction of these openings varies in the different makes of cars, but the device will accommodate itself to the different structures, as will be apparent.

The use of the device will be readily understood from the following description. When it is desired to use the device for lubricating some part of a machine, the bulb 14 is compressed and allowed to expand. Oil will be drawn through the tube 11 into the bulb. The device is now withdrawn from the crank case and the dispensing tip 13 presented to the part to be lubricated. By compressing the bulb 14 oil will be discharged through the tip 13.

In view of the fact that the strips 20 are outwardly bowed, when the device is returned or positioned in the opening in the crank case, the strips 20 will engage the wall of the opening and will be compressed inwardly toward the tube 11, thus frictionally retaining the device within the opening.

While I have specifically shown and described the invention, this is by way of illustration only, and I consider as my own all such modifications in construction as fairly fall within the scope of the appended claim.

I claim:

A combined oiling device and gauge stick comprising a hollow tube having a dispensing tip on one end and a compressible bulb on the other end for creating suction through said tube, a pair of spaced collars on said tube, the uppermost collar being fixed to the tube, bowed spring strips connecting said collars, a disk fixed to said uppermost collar adapted to rest upon a portion of crank case when said tube is disposed through an opening of the crank case, said springs being constructed and arranged to frictionally engage the wall of said opening, and said disk being provided with a gasket upon the underside thereof.

THOMAS J. KEENAN.